Patented Oct. 27, 1931

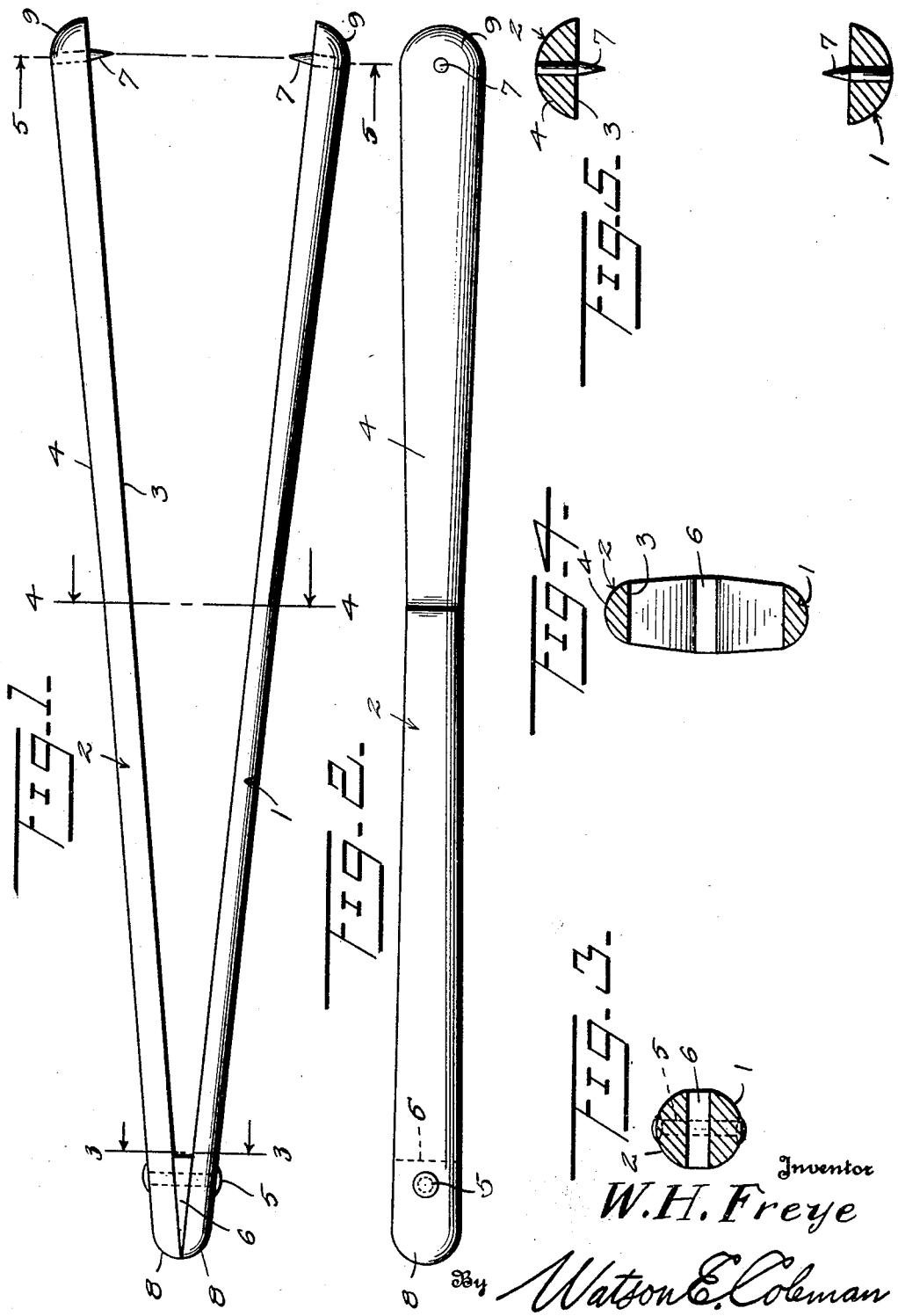

1,829,271

UNITED STATES PATENT OFFICE

WILLIAM H. FREYE, OF SPRINGFIELD, OHIO

PICKLE TONGS

Application filed January 31, 1931. Serial No. 512,727.

This invention relates to tongs and has for one of its objects to provide a novel device of this character which shall be especially adapted to be used for the purpose of lifting pickles from jars, kegs and the like, which shall be adapted to be easily and quickly manipulated, to grip or release a pickle, by the hand in which it is held without danger of it slipping from the hand, and which shall be adapted to grip a pickle in such manner as to prevent the accidental release of the pickle.

The invention has for a further object to provide tongs of the character stated which will not corrode, which shall be simple and durable, and which shall be adapted to be manufactured and sold at a comparatively low cost.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view in side elevation of the tongs.

Figure 2 is a top plan view of the tongs.

Figure 3 is a sectional view taken on the plane indicated by the line 3—3 of Figure 1.

Figure 4 is a sectional view taken on the plane indicated by the line 4—4 of Figure 1, and Figure 5 is a sectional view taken on the plane indicated by the line 5—5 of Figure 1.

The tongs comprises members or legs 1 and 2 which are preferably made from straight grain hard maple, and which are similar in length and in cross and longitudinal sectional formation. The legs 1 and 2 have plane inner surfaces 3 and convex outer surfaces 4, and they gradually increase in thickness and width from their transverse centers towards their ends, the increase in thickness and width being greater towards their front than towards their rear ends. The rear ends of the legs 1 and 2 are secured together by a rivet 5 which is preferably made from aluminum. The legs 1 and 2 are held in forwardly divergent relation by a wooden wedge 6 which is located between the rear ends of the legs and which is held in place by the rivet 5. The legs 1 and 2 are provided near their front or free ends with wooden pins or prongs 7 which are recessed into the legs and which extend inwardly from the legs at right angles to the inner surfaces 3 of the latter. The rear ends of the legs 1 and 2 are rounded, as at 8, and the front ends of the legs are rounded, as at 9.

In practice, the tongs are adapted to be gripped in one hand at or near the transverse centers of their legs 1 and 2. As the legs 1 and 2 gradually increase in thickness and width from their transverse centers towards their ends, the tongs will not slip from the hand while the legs are being manipulated by the hand to grip or release the pickle. To grip a pickle the legs 1 and 2 are forced in the direction of each other to carry the prongs 7 towards each other. Due to the nature of the material from which they are made, the legs 1 and 2 are elastic, and the elasticity thereof is developed while they are being moved in the direction of each other to effect the gripping of a pickle.

After a pickle has been gripped and withdrawn from a jar, keg or the like, the hand is relaxed sufficiently to permit the elasticity of the legs to return them to their normal relation, to the end that the pickle may be released. As the rear and front ends of the legs 1 and 2 are rounded, the tongs may be handled without danger of injury to the handle or to the other pickles in the jar, keg or the like. As the legs 1 and 2, the wedge 6 and the prongs 7 are made of wood, and as the rivet 5 is made of aluminum, the tongs will not corrode.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. Tongs comprising elastic legs arranged in forwardly divergent relation and increasing in thickness and width from their transverse centers towards their ends, a rivet passing through the rear ends of the legs to secure them together, a wedge positioned between the rear ends of the legs and secured in place by the rivet to maintain the legs in said relation, and prongs carried by the front ends of the legs and extending therefrom at right angles to their inner or opposing surfaces.

2. Tongs comprising elastic legs arranged in forwardly divergent relation and gradually increasing in thickness and width from their transverse centers towards their ends, the increase in thickness and width of the legs being greater towards their front than towards their rear ends, a rivet passing through the rear ends of the legs to secure them together, a wedge located between the rear ends of the legs and secured in place by the rivet to hold the legs in such relation, and pins carried by the front ends of the legs and extending therefrom at right angles to their inner or opposing surfaces.

3. Tongs comprising elastic legs arranged in forwardly divergent relation and gradually increasing in thickness and width from their transverse centers towards their ends, the increase in thickness and width of the legs being greater towards their front than towards their rear ends, the legs being made of wood and having plane inner surfaces and convex outer surfaces, a rivet passing through the rear ends of the legs to secure the legs together, a wooden wedge arranged between the rear ends of the legs and secured in place by the rivet to maintain the legs in such relation, and wooden prongs recessed in the front ends of the legs and extending therefrom at right angles to their inner surfaces.

In testimony whereof I hereunto affix my signature.

WILLIAM H. FREYE.